US008837333B2

(12) United States Patent
Saitto et al.

(10) Patent No.: US 8,837,333 B2
(45) Date of Patent: Sep. 16, 2014

(54) SYSTEM FOR SATELLITE COMMUNICATIONS IN TUNNELS

(75) Inventors: Antonio Saitto, Rome (IT); Damiano De Luca, Rome (IT); Rosario Bono, Rome (IT); Daniele D'Ambrosio, Rome (IT)

(73) Assignee: Telespazio S.p.A., Rome (IT)

( * ) Notice: Subject to any disclaimer, the term of this patent is extended or adjusted under 35 U.S.C. 154(b) by 309 days.

(21) Appl. No.: 13/140,683

(22) PCT Filed: Dec. 18, 2009

(86) PCT No.: PCT/IB2009/007807
§ 371 (c)(1),
(2), (4) Date: Dec. 6, 2011

(87) PCT Pub. No.: WO2010/070435
PCT Pub. Date: Jun. 24, 2010

(65) Prior Publication Data
US 2012/0069777 A1    Mar. 22, 2012

(30) Foreign Application Priority Data

Dec. 19, 2008   (EP) ..................................... 08425806

(51) Int. Cl.
*H04B 7/14*         (2006.01)
*H04B 7/185*        (2006.01)

(52) U.S. Cl.
CPC ................................. *H04B 7/18536* (2013.01)
USPC ........ 370/279; 340/988; 340/905; 455/422.1; 455/13.1; 455/13.2; 455/428; 455/435; 370/316

(58) Field of Classification Search
USPC ............... 370/279, 316; 455/12.1, 13.1, 13.2, 455/422.1, 428, 435; 340/426, 539, 988, 340/905
See application file for complete search history.

(56) References Cited

U.S. PATENT DOCUMENTS

| | | | | |
|---|---|---|---|---|
| 5,900,825 | A * | 5/1999 | Pressel et al. ................. | 340/905 |
| 2005/0107954 | A1* | 5/2005 | Nahla ............................ | 701/301 |
| 2006/0012320 | A1* | 1/2006 | Kumar .......................... | 318/376 |
| 2006/0181454 | A1* | 8/2006 | Nichols .................... | 342/357.08 |
| 2009/0073918 | A1* | 3/2009 | Conforto et al. ............. | 370/316 |
| 2010/0265848 | A1* | 10/2010 | Kummetz et al. ............. | 370/255 |

FOREIGN PATENT DOCUMENTS

| | | |
|---|---|---|
| EP | 2061165 | 5/2009 |
| WO | 2006095368 | 9/2006 |
| WO | WO 2006095368 A1 * | 9/2006 |
| WO | 2007113861 | 10/2007 |
| WO | WO 2007113861 A1 * | 10/2007 |
| WO | 2008069438 | 6/2008 |
| WO | WO 2008069438 A1 * | 6/2008 |

OTHER PUBLICATIONS

Pasolini, et al., DVB-S Gap Fillers for Railway Tunnels, IEEE 64th Vehicular Technology Conference: VTC Sep. 25-28, 2006 Montreal, Quebec, Canada: IEEE Operations Center, Sep. 1, 2006, pp. 1-6.
Ryu, et al., The Gap Filler Technology for Mobile Satellite System, Advanced Satellite Mobile Systems, ASMA 2008, pp. 33-36.
PCT International Search Report and Written Opinion dated Mar. 26, 2010.

* cited by examiner

*Primary Examiner* — Faruk Hamza
*Assistant Examiner* — Shah R Zaman
(74) *Attorney, Agent, or Firm* — McCarter & English, LLP (57) ABSTRACT

The present invention relates to a satellite communication system for extending communications between a vehicle and a satellite in an area of non-visibility of the satellite. The satellite communication system comprises a fixed transceiver system and a mobile transceiver system. The fixed transceiver system includes a first antenna intended to be positioned outside the area of non-visibility of the satellite, and at least one second antenna coupled with the first antenna and intended to be positioned in the area of non-visibility of the satellite. The fixed transceiver system is configured to receive through the first antenna downlink signals transmitted by the satellite on at least one downlink carrier frequency and to transmit the received downlink signals on the at least one downlink carrier frequency in the area of non-visibility of the satellite through the at least one second antenna. The mobile transceiver system is intended to be installed on the vehicle, includes a third antenna and a fourth antenna, and is configured to receive through the third antenna the downlink signals transmitted by the fixed transceiver system on the at least one downlink carrier frequency, to receive through the fourth antenna the downlink signals transmitted by the satellite on the at least one downlink carrier frequency, to determine whether the vehicle is in the area of non-visibility of the satellite or in an area of visibility of the satellite, and to transmit uplink signals on at least one uplink carrier frequency through the third antenna if the vehicle is in the area of non-visibility of the satellite or through the fourth antenna if the vehicle is in an area of visibility of the satellite. The fixed transceiver system is further configured to receive through the at least one second antenna the uplink signals transmitted by the mobile transceiver system on the at least one uplink carrier frequency and to transmit the received uplink signals to the satellite on the at least one uplink carrier frequency through the first antenna.

18 Claims, 5 Drawing Sheets

SYSTEM FOR SATELLITE COMMUNICATIONS IN TUNNELS

TECHNICAL FIELD OF THE INVENTION

The present invention relates, in general, to a system that enables communications with a satellite even in areas of non-visibility of the satellite and, in particular, to a system that extends a wide-band signal coming from a satellite in tunnels of any length, enables bidirectional radio communications between the satellite and a moving vehicle that traverses said tunnels and thus ensures continuity of transmission and reception even in absence of visibility of the satellite.

In general, the present invention can be advantageously exploited for guaranteeing wide-band connectivity for railway vehicles in railway tunnels.

In particular, the present invention finds advantageous, albeit non-exclusive, application in the field of wide-band communications services based on the Internet Protocol (IP) and provided on high-speed trains.

In any case, the present invention can be advantageously applied to guarantee exploitation also of other types of services, such as, for example, satellite navigation services or services linked to safety in the railway sector, solving, also for said type of services, the problems linked to the discontinuity of the service due to the presence of tunnels.

BACKGROUND ART

In many countries, such as, for example, Italy, France and Germany, there currently exist different activities of development of wide-band satellite communication services based on IP for high-speed trains. In fact, these services are expected to become soon a specific characteristic both of high-speed trains and of traditional ones.

Examples of services that can be exploited by means of a satellite communication system of a train may be:
- services based on Voice-over-IP (VoIP) technology;
- video-surveillance services;
- use of video in streaming, for example on demand;
- digital television, for example according to the standard Digital Video Broadcasting-Satellite or Digital Video Broadcasting-Handheld (DVB-S or DVB-H);
- Internet netsurfing;
- e-mail consultation;
- Instant Messaging (IM) services;
- consultation of electronic files and/or databases; and
- services based on File Transfer Protocol (FTP).

As is known, on current railway networks of many countries, such as, for example, Italy, various obstacles may be encountered that hinder the visibility of the satellites and that hence can cause discontinuity of the satellite communication services provided on board trains.

In particular, when a train traverses a railway tunnel there is a complete interruption of the direct train-satellite connection.

In order to solve the above problem, it is known to use systems that extend satellite signals into railway tunnels.

A system of the aforesaid type is described in JP2001230718.

In particular, JP2001230718 proposes a satellite communication system for areas in which reception of the satellite signal is poor, the system being based on the use of a satellite receiver apparatus and a transmitter apparatus, which are connected by means of a coaxial cable. Said satellite communication system supports only unidirectional communications, i.e., ones based on signals of a broadcast type, and does not provide solutions to the problem of configuration of mobile terminals that must operate in this context. In addition, JP2001230718 does not propose solutions for switching between the satellite radio channel and the radio channel retransmitted by the satellite communication system.

Similar considerations may be made also as regards the patent application JP2001308765, which proposes a solution for extending a satellite signal of a broadcast type in a tunnel by means of a communications system formed by a satellite receiver antenna positioned outside the tunnel and a plurality of radiotransmitting units inside the tunnel connected by optical fibre.

A further solution for retransmitting signals coming from a satellite to mobile terminals that are located in areas of non-visibility of the satellite is described in WO2007113861.

In particular, WO2007113861 describes a system that comprises a fixed terminal for illumination of a tunnel connected to a fixed satellite station, and a mobile terminal installed on a train and connected to a mobile satellite terminal. In the link from the satellite to the train, the external fixed satellite station receives the satellite signal transmitted by the satellite and directed to the train, and retransmits it into the tunnel through the fixed terminal. In the link from the train to the satellite, the fixed terminal receives the signal transmitted by the train and directed to the satellite, and retransmits it out of the tunnel by means of the external fixed satellite station.

Moreover, once again according to the invention described in WO2007113861, the train is equipped with a transceiver apparatus connected to the mobile satellite terminal which enables exchange of signals directly with the satellite in the periods in which there is visibility between the train and the satellite, i.e., when the train travels in open spaces in which no obstacles are present. When the train exits from an area of visibility of the satellite and enters a tunnel, the system automatically carries out a switching between the satellite channel and the radio channel available in the tunnel, which conveys the same satellite signal but on a different carrier frequency. In a similar way, when the train exits the tunnel and enters an area of visibility of the satellite, the system automatically carries out a switching between the radio channel available in the tunnel and the satellite channel. Switching between channels is carried out in accordance with a logic that processes the information on the quality of the channels and decides which of the two channels to use.

In the system proposed in WO2007113861 the carrier frequencies of the satellite channel and of the radio channel in the tunnel in the satellite-train direction, i.e., in downlink, are mutually linked by a first defined frequency-conversion relationship. Likewise, the carrier frequencies of the satellite channel and of the radio channel in the tunnel in the train-satellite direction, i.e., in uplink, are mutually linked by a second defined frequency-conversion relationship.

The conversions of carrier frequency that the satellite signals undergo both in downlink and in uplink render the system proposed in WO2007113861 somewhat complex and hence rather costly to implement.

Finally, European patent application EP1861530 filed in the name of the Applicant describes a system for extending in railway tunnels navigation satellite signals, such as, for example, GPS (Global Positioning System), GLONASS, or Galileo signals. Said system comprises an antenna positioned outside a tunnel, configured to receive the navigation satellite signals and connected to a plurality of repeaters installed inside the tunnel. The external antenna receives the navigation satellite signals and supplies them to the repeaters which retransmit them inside the tunnel.

OBJECT AND SUMMARY OF THE INVENTION

The Applicant has conducted an in-depth study aimed at investigating the possibilities of improving the system described in EP1861530 in order to be able to exploit it also in the context of wide-band bidirectional communication services provided on trains and, simultaneously, also in order to develop a system for extending a signal coming from a satellite in areas of non-visibility of the satellite that will be able to overcome the disadvantages of known systems.

Consequently, the objective of the present invention is to provide a satellite communication system for extending communications between a vehicle and a satellite in an area of non-visibility of the satellite that will be able to alleviate the disadvantages previously described.

The aforesaid objective is achieved by the present invention in that it relates to a satellite communication system for extending communications between a vehicle and a satellite in an area of non-visibility of the satellite, as defined in the appended claims.

In particular, the satellite communication system according to the present invention comprises a fixed transceiver system and a mobile transceiver system. The fixed transceiver system comprises a first antenna intended to be positio ned outside the area of non-visibility of the satellite, and at least one second antenna coupled with the first antenna and intended to be positioned in the area of non-visibility of the satellite. The fixed transceiver system is configured to:
- receive, through the first antenna, downlink signals transmitted by the satellite on at least one downlink carrier frequency; and
- transmit the received downlink signals on the at least one downlink carrier frequency in the area of non-visibility of the satellite through the at least one second antenna.

The mobile transceiver system is intended to be installed on the vehicle, comprises a third antenna and a fourth antenna, and is configured to:
- receive, through the third antenna, the downlink signals transmitted by the fixed transceiver system on the at least one downlink carrier frequency;
- receive, through the fourth antenna, the downlink signals transmitted by the satellite on the at least one downlink carrier frequency;
- determine whether the vehicle is in the area of non-visibility of the satellite or in an area of visibility of the satellite; and
- transmit uplink signals on at least one uplink carrier frequency through the third antenna if the vehicle is in the area of non-visibility of the satellite or through the fourth antenna if the vehicle is in an area of visibility of the satellite.

The fixed transceiver system is further configured to:
- receive, through the at least one second antenna, the uplink signals transmitted by the mobile transceiver system on the at least one uplink carrier frequency; and
- transmit the received uplink signals to the satellite on the at least one uplink carrier frequency through the first antenna.

BRIEF DESCRIPTION OF THE DRAWINGS

For a better understanding of the present invention, some preferred embodiments, provided purely by way of explanatory and non-limiting example, will now be illustrated with reference to the annexed drawings (which are not in scale), wherein.

DETAILED DESCRIPTION OF PREFERRED EMBODIMENTS OF THE INVENTION

The ensuing description is provided for enabling a person skilled in the sector to reproduce and use the invention. Various modifications to the embodiments presented will be immediately evident to persons skilled in the sector, and the generic principles disclosed herein could be applied to other embodiments and applications, without, however, this implying any departure from the scope of protection of the present invention.

Consequently, the present invention must not be understood as being limited to just the embodiments described and shown, but the invention must be granted the widest scope of protection consistently with the principles and characteristics presented herein and defined in the annexed claims.

The present invention regards a satellite communication system for extending communications between a vehicle and a satellite in an area of non-visibility of the satellite, in particular in a tunnel of any length.

Consequently, the present invention solves the problems linked to discontinuities in satellite communication services due to the lack of visibility of the satellites.

Broadly speaking, the satellite communication system comprises:
- a fixed transceiver system that is able to guarantee a "seamless" service and can be installed in areas of non-visibility of the satellites; in particular, it can be coupled to railway tunnels of any length; and
- a mobile transceiver system integrated directly with satellite transceiver apparatuses already installed on moving vehicles, in particular trains, and configured to switch automatically between one or more satellite channels available in areas of visibility of the satellites and one or more radio channels provided by the fixed transceiver system in the areas of non-visibility of the satellites, in particular inside railway tunnels.

Preferably, the fixed transceiver system is configured to turn on automatically or to be turned on automatically when a train approaches the respective tunnel to which it is coupled.

Figure 1:
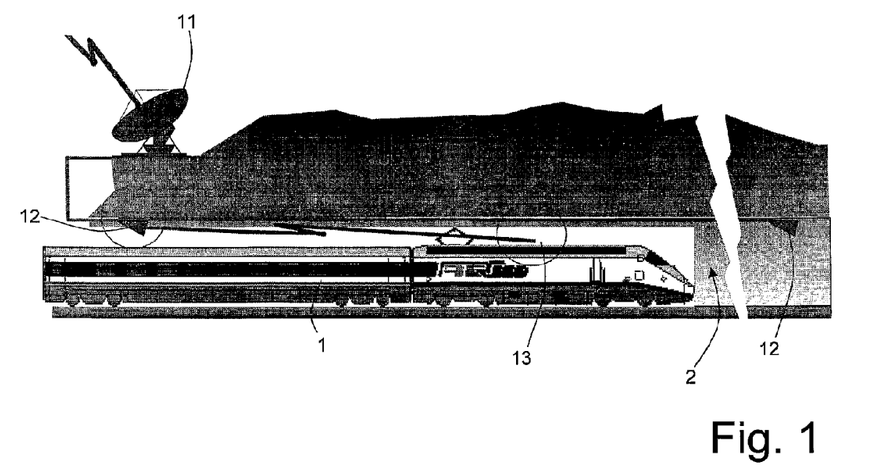
FIG. 1 is a schematic illustration of a first scenario of example in which a satellite communication system according to the present invention operates.

FIG. 1 is a schematic illustration of a scenario provided by way of example in which the satellite communication system according to the present invention operates.

In particular, FIG. 1 is a schematic illustration of a train 1 that is travelling in a railway tunnel 2 installed in which is said satellite communication system, which comprises:
- a fixed satellite antenna 11 positioned outside the railway tunnel 2 and configured to receive downlink signals transmitted by a satellite (not shown in FIG. 1) on one or more downlink carrier frequencies;
- a plurality of fixed ground antennas 12 positioned inside the railway tunnel 2 in such a way as to cover the entire length of the railway tunnel 2, coupled with the fixed satellite antenna 11, preferably by means of optical-fibre connections, and configured to retransmit inside the railway tunnel 2 on the downlink carrier frequencies the downlink signals received by the fixed satellite antenna 11; and
- a mobile ground antenna 13 installed on the roof of the train 1, configured to receive, when the train 1 is in the railway tunnel 2, the downlink signals retransmitted inside the railway tunnel 2 by the fixed ground antennas 12 and to transmit on one or more uplink carrier frequencies uplink signals for uplink communications of users present on the train 1; said fixed ground antennas 12 being further configured to receive the uplink signals transmitted by the mobile ground antenna 13; said fixed satellite antenna 11 being further configured to transmit to the satellite on the uplink carrier frequencies the uplink signals received by the fixed ground antennas 12; on the roof of the train 1 there being installed also a mobile satellite antenna (not shown in FIG. 1) configured to receive the downlink signals directly from the satellite and to transmit the uplink signals directly to the satellite in areas in which the satellite is visible.

In addition, the train 1 will be conveniently provided with an internal communication network (not shown in FIG. 1) of a LAN (Local Area Network) type, preferably wireless, coupled with the mobile ground antenna 13 and with the mobile satellite antenna and designed to enable users present on the train 1 and equipped with electronic devices such as smartphones, laptops, etc., to use communication services based on the downlink and uplink signals.

The fixed satellite antenna 11, the fixed ground antennas 12, and the optical-fibre connections that connect them make up the fixed transceiver system of the satellite communication system. Said fixed transceiver system can be viewed as a transparent station of a relay type that extends the satellite radio channel/channels in the tunnel 2 enabling users present on the train 1 to communicate unidirectionally and/or bidirectionally also in the tunnel, i.e., in an area in which the satellite is not visible.

Preferably, said fixed transceiver system is equipped with an automatic turning-on/turning-off system that serves to limit the environmental impact due to the transmission inside the tunnel 2 when no trains are present and to increase the service life of the fixed transceiver system itself.

In addition, the mobile ground antenna 13 is configured to receive the downlink signals retransmitted inside the railway tunnel 2 by the fixed ground antennas 12 in directions other than the ones of normal pointing of the mobile satellite antenna, which, instead, must be continuously aligned with the satellite.

In other words, the mobile ground antenna 13 is a non-directional antenna, whereas the mobile satellite antenna is a directional antenna installed on the roof of the train 1 in such a way as to be continuously aligned with the satellite.

Likewise, the fixed satellite antenna 11 is a directional antenna installed outside the railway tunnel 2 in such a way as to be continuously aligned with the satellite, whereas each fixed ground antenna 12 is a non-directional antenna.

An automatic switching is managed on the train 1 between the satellite radio channel/channels present in areas of visibility of the satellite/satellites and the ground radio channel/channels present in areas of non-visibility of the satellite/satellites, for example in the tunnel 2, by means of a mobile transceiver system installed on the train 1, which comprises the mobile ground antenna 13 and the mobile satellite antenna and which will be described in greater detail in what follows.

Figure 2:
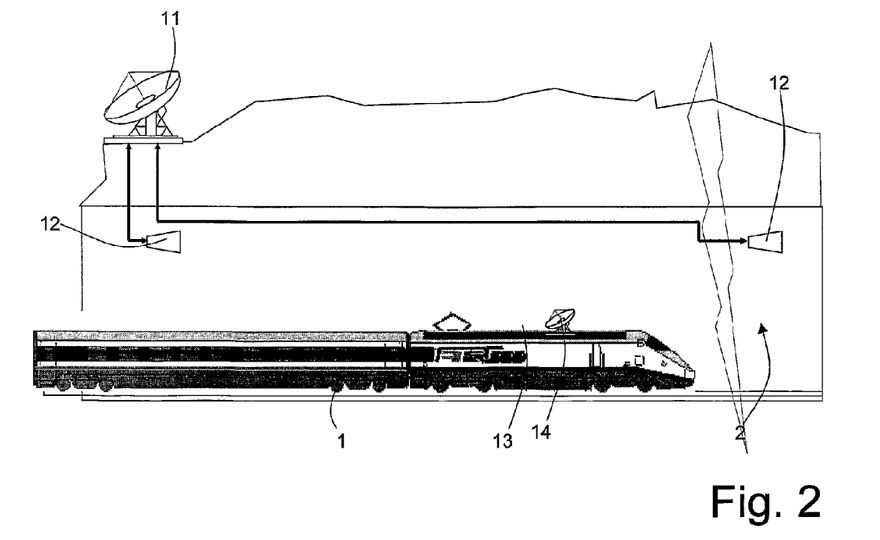
FIG. 2 illustrates in greater detail the satellite communication system of FIG. 1.

FIG. 2 illustrates in greater detail the satellite communication system shown in FIG. 1 and described previously.

In particular, the components of the satellite communication system shown in FIG. 1 and described previously are designated in FIG. 2 by the same reference numbers as the ones used in FIG. 1 and are not described again in detail.

In detail, FIG. 2 shows:
- the train 1 inside the tunnel 2;
- the fixed satellite antenna 11, positioned outside the railway tunnel 2 in perfect visibility of the satellite (not shown either in FIG. 2), designed to receive/transmit the downlink/uplink signals from/to the satellite on the downlink/uplink carrier frequencies, and consequently aligned with the satellite, i.e., having a radiation pattern such as to guarantee an alignment with the satellite, i.e., a pointing of the satellite;
- the fixed ground antennas 12, positioned inside the railway tunnel 2, coupled with the fixed satellite antenna 11, and designed to receive/transmit the uplink/downlink signals on the uplink/downlink carrier frequencies from/to trains that are inside the tunnel 2, such as, for example, the train 1;
- the mobile ground antenna 13 with low directionality, installed on the roof of the train 1, and designed to receive/transmit the downlink/uplink signals on the downlink/uplink carrier frequencies when the train 1 is in areas where the satellite is not visible, for example when the train 1 is in the tunnel 2; and
- the mobile satellite antenna, installed on the roof of the train 1, designed to receive/transmit the downlink/uplink signals from/to the satellite on the downlink/uplink carrier frequencies when the train 1 is in areas where the satellite is visible, and consequently aligned with the satellite, i.e., having a radiation pattern such as to guarantee a continuous alignment with the satellite, i.e., a continuous pointing of the satellite, the mobile satellite antenna being designated in FIG. 2 by 14.

The fixed satellite antenna 11 may be viewed as a gateway antenna towards the satellite of the fixed transceiver system with which the tunnel 2 is equipped.

The fixed ground antennas 12 can be viewed as repeaters, inside the tunnel 2, of the signals coming from the satellite and received by the fixed gateway satellite antenna 11.

The number of fixed ground antennas 12 installed in the tunnel 2 depends upon the sizing in link budget of each individual fixed ground antenna 12 with the mobile ground antenna 13 and upon the length of the tunnel 2.

Figure 3:
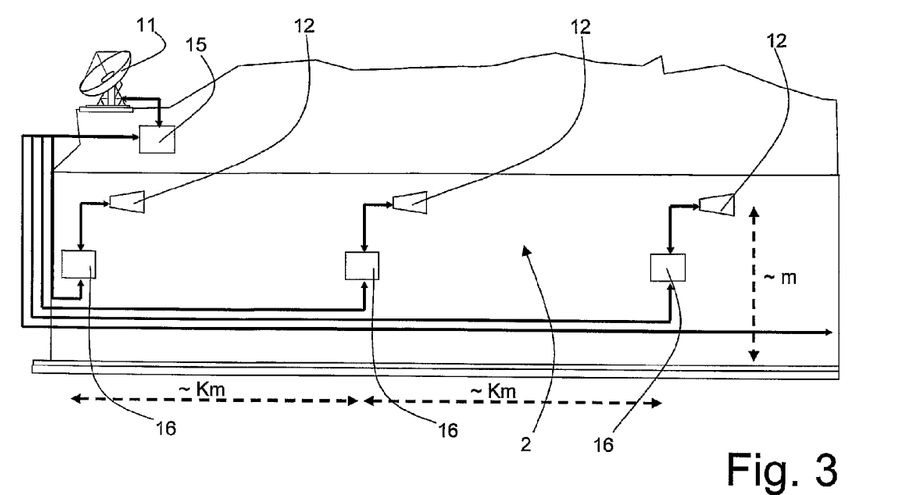
FIG. 3 is a schematic illustration of a first subsystem of the satellite communication system of FIGS. 1 and 2 according to a first embodiment of the present invention.

FIG. 3 illustrates in greater detail the fixed transceiver system, which comprises the fixed satellite antenna 11 and the fixed ground antennas 12.

In particular, as is shown in FIG. 3, the fixed satellite antenna 11 is coupled with a first signal distribution/acquisition electro-optical system 15 which is in turn coupled by means of optical-fibre connections with a plurality of second signal distribution/acquisition electro-optical systems 16, each of which is coupled with a respective fixed ground antenna 12.

Figure 4:
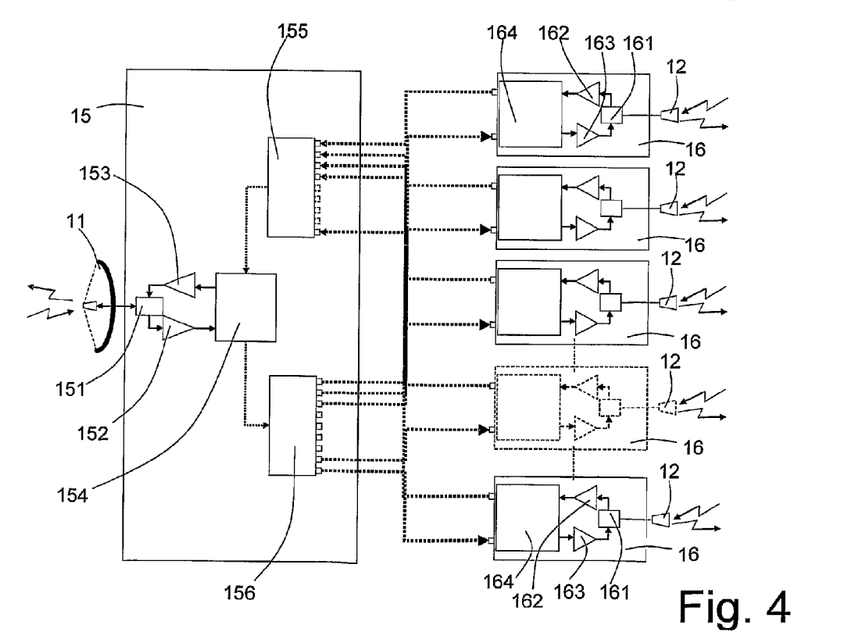
FIG. 4 illustrates in greater detail the first subsystem of FIG. 3.
Figure 5:
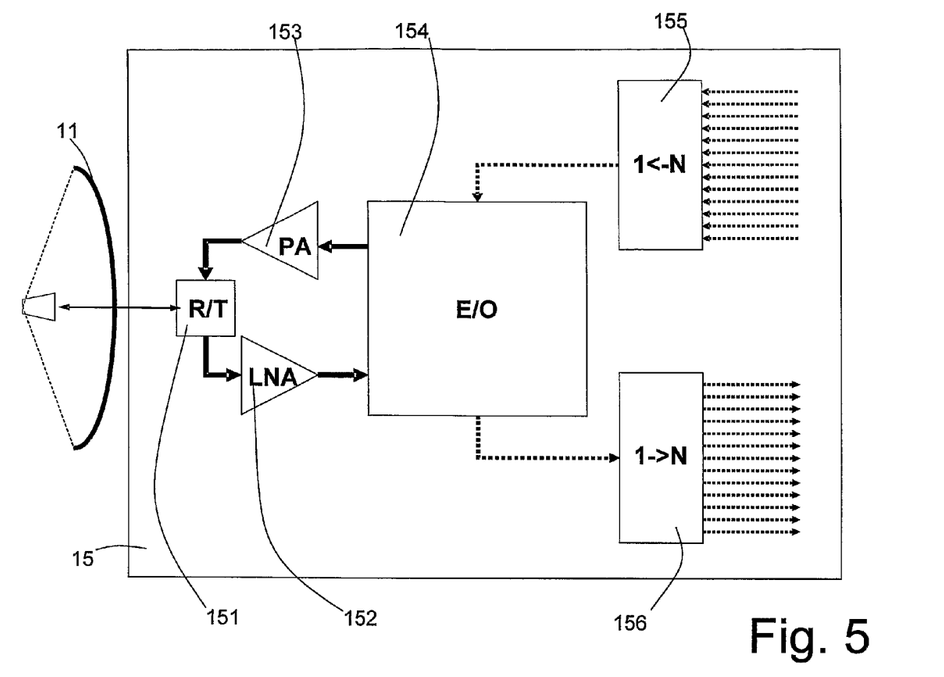
FIG. 5 illustrates in detail first components of the first subsystem of FIG. 4.
Figure 6:
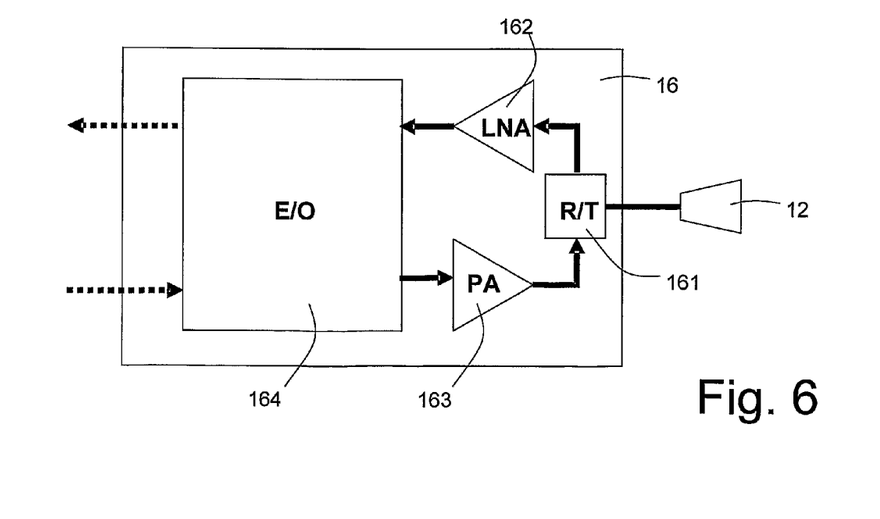
FIG. 6 illustrates in detail second components of the first subsystem of FIG. 4.

In addition, FIG. 4 shows a block diagram that represents in even greater detail the fixed transceiver system shown in FIG. 3, in particular the first signal distribution/acquisition electro-optical system 15 and the second signal distribution/acquisition electro-optical systems 16, FIG. 5 shows an enlargement of the first signal distribution/acquisition electro-optical system 15 shown in FIG. 4, and FIG. 6 shows an enlargement of one of the second signal distribution/acquisition electro-optical systems 16 illustrated in FIG. 4.

In particular, as is shown in FIGS. 4 and 5, the first signal distribution/acquisition electro-optical system 15 comprises:
- a first duplexer (R/T) 151 coupled with the fixed satellite antenna 11;
- a first low-noise amplifier (LNA) 152 connected by means of a coaxial cable to the first duplexer (R/T) 151;
- a first power amplifier (PA) 153 connected by means of a coaxial cable to the first duplexer (R/T) 151;
- a first bidirectional electro-optical converter (E/O) 154 connected by means of a coaxial cable to the first low-noise amplifier (LNA) 152 and to the first power amplifier (PA) 153;
- an optical combiner (1←N) 155 connected by optical fibre to the first electro-optical converter (E/O) 154; and
- an optical splitter (1→N) 156 connected by optical fibre to the first electro-optical converter (E/O) 154.

Instead, as shown in FIGS. 4 and 6, each second signal distribution/acquisition electro-optical system 16 comprises:
- a respective second duplexer (R/T) 161 coupled with the respective fixed ground antenna 12;
- a respective second low-noise amplifier (LNA) 162 connected by means of a coaxial cable to the respective second duplexer (R/T) 161;
- a respective second power amplifier (PA) 163 connected by means of a coaxial cable to the respective second duplexer (R/T) 161; and
- a respective second bidirectional electro-optical converter (E/O) 164 connected by means of a coaxial cable to the respective second low-noise amplifier (LNA) 162 and to the respective second power amplifier (PA) 163.

The first duplexer (R/T) 151 is configured to route the downlink signals, i.e., the signals for communications in the satellite-train direction, from the fixed satellite antenna 11 to the first low-noise amplifier (LNA) 152 and the uplink signals, i.e., the signals for communications in the train-satellite direction, from the first power amplifier (PA) 153 to the fixed satellite antenna 11.

During normal operation of the fixed transceiver system, a signal received by the fixed satellite antenna 11 is first routed by the first duplexer (R/T) 151 to the first low-noise amplifier (LNA) 152, then amplified by said first low-noise amplifier (LNA) 152, and then converted from radio frequency (RF) to optical frequency by the first electro-optical converter (E/O) 154. The signal converted into optical frequency, travelling on optical fibre, reaches the optical splitter (1→N) 156 with N outputs, where N is equal to the number of fixed ground antennas 12 installed in the tunnel 2, which splits the optical-frequency signal received into N optical-frequency signals, each of which is supplied on a respective output of the optical splitter (1→N) 156.

In addition, each of the N optical-frequency signals supplied at output from the optical splitter (1→N) 156, travelling on the optical fibre, reaches a respective second electro-optical converter (E/O) 164, which converts it from optical frequency to radio frequency (RF). The signal converted into radio frequency (RF) is first amplified by the respective second power amplifier (PA) 163 and then routed by the respective second duplexer (R/T) 161 to the respective fixed ground antenna 12, which transmits it in the tunnel 2.

Likewise, a signal received by a fixed ground antenna 12 is first routed by the respective second duplexer (R/T) 161 to the respective second low-noise amplifier (LNA) 162, then amplified by said respective second low-noise amplifier (LNA) 162, and then converted from radio frequency (RF) to optical frequency by the respective second electro-optical converter (E/O) 164. The signal converted to optical frequency, travelling on optical fibre, reaches the optical combiner (1←N) 155 with N inputs, which combines the N optical-frequency signals that it receives at input into a single combined optical-frequency signal, which is supplied at output. Said combined optical-frequency signal, travelling on optical fibre, reaches the first electro-optical converter (E/O) 154, which converts it from optical frequency to radio frequency (RF). The combined signal converted to radio frequency (RF) is first amplified by the first power amplifier (PA) 153 and then routed by the first duplexer (R/T) 151 to the fixed satellite antenna 11, which transmits it to the satellite.

Figure 7:
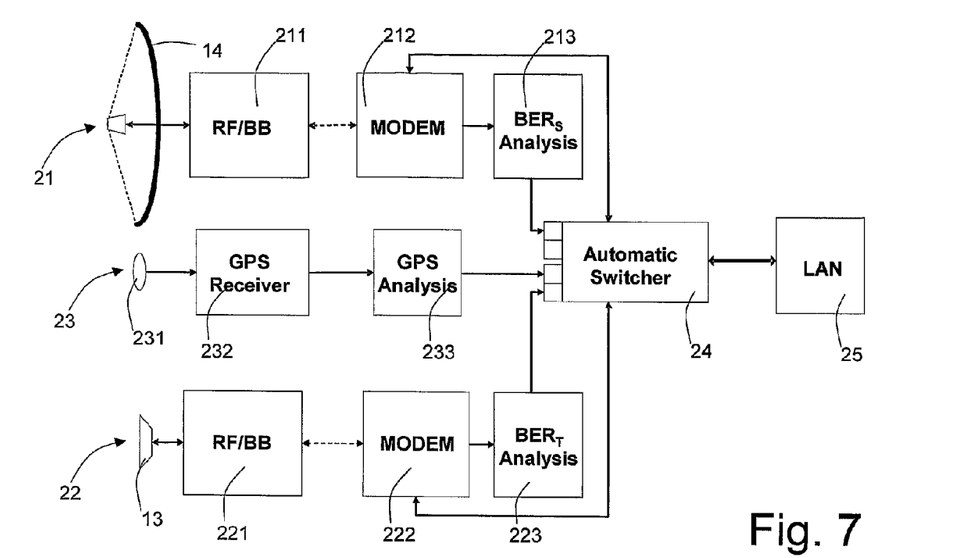
FIG. 7 illustrates in detail a second subsystem of the satellite communication system of FIGS. 1 and 2.

In addition, FIG. 7 shows a block diagram that illustrates in detail the mobile transceiver system installed on the train 1.

In particular, as shown in FIG. 7, said mobile transceiver system comprises:
- a satellite subsystem 21;
- a ground subsystem 22;
- a satellite navigation subsystem 23; and
- a subsystem automatic switcher 24 coupled with the satellite subsystem 21, with the ground subsystem 22, with the satellite navigation subsystem 23, and with the internal communication network (LAN) of the train 1 (in FIG. 7 designated by 25) and configured to switch automatically between the satellite subsystem 21 and the ground subsystem 22 the communications from/to the internal communication network (LAN) 25.

In greater detail, once again as shown in FIG. 7, the satellite subsystem 21 comprises:
- the mobile satellite antenna 14;
- a first converter (RF/BB) 211, coupled with the mobile satellite antenna 14, and configured to bring down to baseband (BB) the downlink signals received at radio frequency (RF) by the mobile satellite antenna 14 and to bring to radio frequency (RF) the uplink signals at baseband (BB) that are to be transmitted by the mobile satellite antenna 14;
- a first modem 212, coupled with the first converter (RF/BB) 211 and with the subsystem automatic switcher 24, and configured to modulate/demodulate the uplink/downlink signals at baseband (BB); and
- a first analysis module 213, coupled with the first modem 212 and with the subsystem automatic switcher 24, and configured to analyse a quality of the downlink satellite radio channel/channels.

In addition, once again as shown in FIG. 7, the ground subsystem 22 comprises:
- the mobile ground antenna 13;
- a second converter (RF/BB) 221, coupled with the mobile ground antenna 13, and configured to bring down to baseband (BB) the downlink signals received at radio frequency (RF) by the mobile ground antenna 13 and to bring to radio frequency (RF) the uplink signals at baseband (BB) that must be transmitted by the mobile ground antenna 13;
- a second modem 222, coupled with the second converter (RF/BB) 221 and with the subsystem automatic switcher 24, and configured to modulate/demodulate the uplink/downlink signals at baseband (BB); and a second analysis module 223, coupled with the second modem 222 and with the subsystem automatic switcher 24, and configured to analyse a quality of the downlink ground radio channel/channels.

Finally, once again as shown in FIG. 7, the satellite navigation subsystem 23 comprises:

a mobile GPS antenna 231, configured to receive the navigation satellite signals transmitted by the GPS system;

a GPS receiver 232, coupled with the mobile GPS antenna 231, and configured to compute the position of the train 1 on the basis of the signals received by the mobile GPS antenna 231; and a third analysis module 233, coupled with the GPS receiver 232 and with the subsystem automatic switcher 24, and configured to analyse the received GPS signals.

As may be readily understood from FIG. 7 for a person skilled in the sector, the downlink signals received, respectively, by the mobile satellite antenna 14 and by the mobile ground antenna 13 are first brought from radio frequency (RF) down to baseband (BB), respectively, by the first converter (RF/BB) 211 and by the second converter (RF/BB) 221, are then demodulated, respectively, by the first modem 212 and by the second modem 222, and are then supplied to the subsystem automatic switcher 24 and, respectively, to the first analysis module 213 and to the second analysis module 223.

The first analysis module 213 determines the quality of the downlink satellite radio channel/channels on the basis of an analysis of the signal-to-noise ratio or of the energy-per-bit-to-noise-power-spectral-density ratio ($E_b/N_0$), or else of the bit-error rate ("Bit Error Rate"—BER), of the downlink signals received by the mobile satellite antenna 14, brought down to baseband (BB) and demodulated.

The second analysis module 223 determines the quality of the downlink ground radio channel/channels on the basis of an analysis of the signal-to-noise ratio, or of the energy-per-bit-to-noise-power-spectral-density ratio $E_b/N_0$, or else of the BER, of the downlink signals received by the mobile ground antenna 13, brought down to baseband (BB) and demodulated.

The subsystem automatic switcher 24 is configured to enable use of the mobile satellite antenna 14 or of the mobile ground antenna 13 according to whether the train 1 is or is not in an area of visibility of the satellite, in particular outside or inside a railway tunnel, such as, for example, the tunnel 2.

In particular, when the train 1 is in an area of visibility of the satellite, the signals are received and transmitted via the mobile satellite antenna 14, whereas, when the train is inside a railway tunnel, for example the tunnel 2, the signals are received and transmitted via the mobile ground antenna 13.

In detail, the subsystem automatic switcher 24, on the basis of the results of the analyses carried out by the first analysis module 213 and by the second analysis module 223 on the demodulated signals at baseband (BB) and by the third analysis module 233 on the GPS signals received, automatically decides which transceiving subsystem to use between the satellite subsystem 21 and the ground subsystem 22. Consequently, according to which transceiving subsystem is being used between the satellite subsystem 21 and the ground subsystem 22, the subsystem automatic switcher 24 routes the respective downlink signals at baseband (BB) demodulated on the internal communication network (LAN) 25 of the train 1.

Likewise, on the uplink, the subsystem automatic switcher 24 routes the uplink signals coming from the internal communication network (LAN) 25 on the transceiving subsystem being used between the satellite subsystem 21 and the ground subsystem 22, said signals being first modulated, respectively, by the first modem 212 or by the second modem 222, then brought from baseband (BB) to radio frequency (RF), respectively, by the first converter (RF/BB) 211 or by the second converter (RF/BB) 221, and then transmitted, respectively, by the mobile satellite antenna 14 or by the mobile ground antenna 13.

Conveniently, the mobile ground antenna 13 can be installed under the cockpit of the passenger compartment of the train 1 at a pre-set distance from the mobile satellite antenna 14 such as to avoid a loop of the signals.

In particular, once again to avoid a loop of the signals, the mobile satellite antenna 14 and the mobile ground antenna 13 can be conveniently insulated by electromagnetic traps well sized at the operating frequencies of the satellite signal and set at a significant distance apart.

As previously mentioned, the logic of switching between the satellite subsystem 21 and the ground subsystem 22 is based on analysis of the quality of the downlink satellite and ground radio channels, in particular of the signal-to-noise ratio or of the $E_b/N_0$ ratio, or else of the BER, and according to information transmitted by the third analysis module 233, which is able to detect entry of the train 1 into the tunnel 2.

Figure 8:
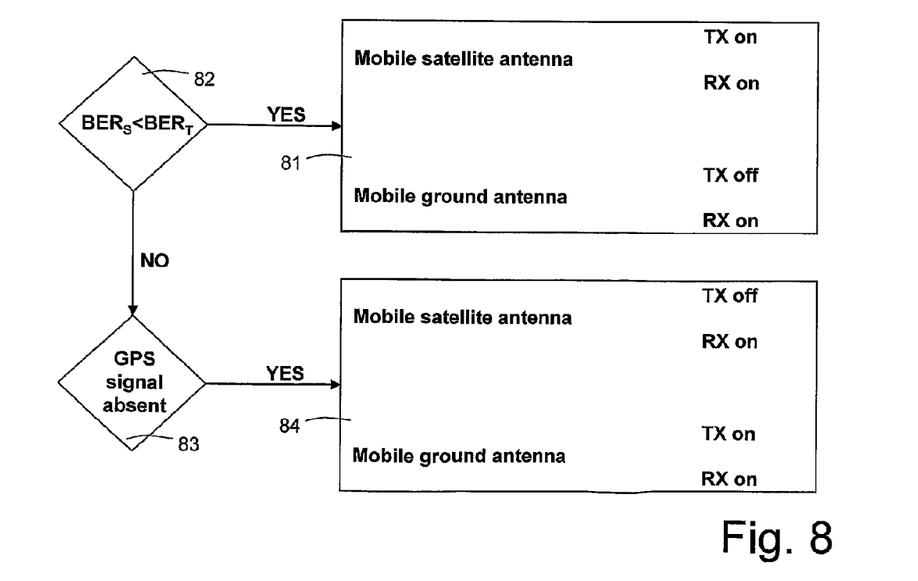
FIG. 8 is a schematic illustration of a logic of operation of the second subsystem of FIG. 7.

In this regard, illustrated in FIG. 8 is a flowchart that represents a logic for automatic switching between the satellite subsystem 21 and the ground subsystem 22 according to a first preferred embodiment of the present invention.

In particular, as shown in FIG. 8, the signals are received and transmitted (TX-RX on) through the mobile satellite antenna 14 and are only received (TX off-RX on) through the mobile ground antenna 13 (first block 81) if a first bit-error rate $BER_S$ calculated by the first analysis module 213 on the basis of the downlink signals received by the mobile satellite antenna 14, brought down to baseband and demodulated, is lower than a second bit-error rate $BER_T$ calculated by the second analysis module 223 on the basis of the downlink signals received by the mobile ground antenna 13, brought down to baseband, and demodulated (condition present in a second block 82), whereas if the first bit-error rate $BER_S$ is higher than the second bit-error rate $BER_T$ and the GPS signal is absent (condition present in a third block 83), i.e., the third analysis module 233 detects that the mobile GPS antenna 231 is not receiving any GPS signal, the signals are received and transmitted (TX on-RX on) through the mobile ground antenna 13 and are only received (TX off-RX on) through the mobile satellite antenna 14.

The use of the subsystem automatic switcher 24 enables drastic elimination of any possible interference.

Another advantage linked to the double-antenna structure is that of optimization of the reception of the signal through the duplication of the signal on both of the antennas.

The mobile ground antenna 13 is preferably a small antenna with low directionality.

Alternatively, according to a second preferred embodiment of the present invention, the automatic switching logic can also be based just upon a processing of the GPS signals received by the mobile GPS antenna 231.

In this regard, described in the European patent application No. EP1861530, filed in the name of the Applicant and incorporated herein by reference, is a system for extending signals for satellite navigation, in particular GPS signals, in tunnels, which, among its various functions, is also able to determine, i.e., detect, when a train enters a tunnel. Said characteristic of the system described in the document No. EP1861530 can be advantageously exploited also by the present invention.

Figure 9:
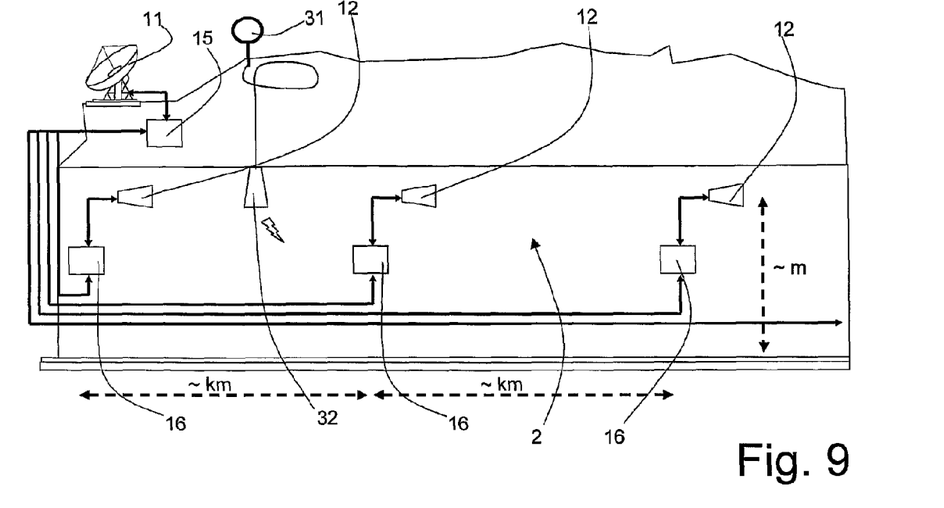
FIG. 9 is a schematic illustration of the first subsystem of the satellite communication system of FIGS. 1 and 2 according to a second embodiment of the present invention.

In this connection, shown in FIG. 9 is a system for extending the GPS signal in the tunnel 2 of the type described in EP1861530.

As shown in FIG. 9, the system for extending the GPS signal in the tunnel 2 comprises:
- a fixed GPS antenna 31 positioned outside the tunnel 2 and configured to receive the GPS signals; and
- M repeaters 32 positioned inside the tunnel, coupled with the fixed GPS antenna 31, and configured to retransmit inside the tunnel 2 the GPS signals received by the fixed GPS antenna 31, where M is an integer and in FIG. 9 is equal to unity; i.e., only one repeater 32 is shown in FIG. 9.

In addition, according to a second preferred embodiment of the present invention, the mobile transceiver system of the train 1 may not comprise the analysis modules 213, 223 and 233, whilst the GPS receiver 232 is directly coupled with the subsystem automatic switcher 24 for notifying it when the train 1 enters a tunnel or exits from a tunnel, in particular when the train 1 enters the tunnel 2 or exits from the tunnel 2.

In addition, according to this embodiment of the present invention, the subsystem automatic switcher 24 switches the communications from/to the internal communication network (LAN) 25 between the satellite subsystem 21 and the ground subsystem 22 upon entry/exit of the train 1 into/from the tunnel 2.

In particular, the GPS receiver 232 is configured to:
compute, on the basis of the GPS signals received by the mobile GPS antenna 231, phase and pseudorange data and an overall clock error that includes an intrinsic clock error and, when the train 1 is inside a tunnel, in particular inside the tunnel 2, an additional clock error that depends upon the position of the mobile GPS antenna 231 with respect to the fixed GPS antenna 31;
determine, on the basis of the computed overall clock error, when the train 1 enters a tunnel, in particular the tunnel 2, and when the train 1 exits from a tunnel, in particular the tunnel 2;
if the train 1 is outside a tunnel, in particular outside the tunnel 2, compute the position of the train 1 on the basis of the computed phase and pseudorange data;
if the train 1 is inside a tunnel, in particular inside the tunnel 2, compute the additional clock error in the computed overall clock error, correct the computed phase and pseudorange data on the basis of the computed additional clock error, and compute the position of the train 1 on the basis of the corrected phase and pseudorange data; and
notify to the subsystem automatic switcher 24 when the train 1 enters a tunnel and when the train 1 exits from a tunnel, in particular when the train 1 enters the tunnel 2 and when the train 1 exits from the tunnel 2, said subsystem automatic switcher 24 accordingly switching the communications from/to the internal communication network (LAN) 25 between the satellite subsystem 21 and the ground subsystem 22.

As previously mentioned, preferably the fixed transceiver system may in addition be configured to:
turn on automatically if it is off and a train, for example the train 1, is about to enter the tunnel 2; and
turn off automatically if a train, for example the train 1, exits from the tunnel 2 and there is no other train in the tunnel 2.

In particular, the satellite communication system can comprise an automatic turning on/off system coupled with the fixed transceiver system and comprising:
at least one sensor installed outside the tunnel 2 and configured to detect if a train, for example the train 1, is about to enter the tunnel 2 and to detect if a train, for example the train 1, has exited from the tunnel 2; and
a turning on/off control unit, coupled with the fixed transceiver system and with the sensor, and configured to turn on the fixed transceiver system if it is off and the sensor detects that a train, for example the train 1, is about to enter the tunnel 2 and to turn off the fixed transceiver system if the sensor detects that a train, for example the train 1, has exited from the tunnel 2 and there is no other train in the tunnel 2.

Conveniently, the automatic turning on/off system can comprise:
one or more passage sensors installed along the railway track at a pre-set distance from the tunnel equipped with the fixed transceiver system, for example the tunnel 2, and configured to detect the passage of a train and the direction of displacement of said train; and
the turning on/off control unit, which is always active and is coupled with the fixed transceiver system and connected to the passage sensors.

When the passage sensors detect the passage of a train, they communicate said passage to the turning on/off control unit together with the direction of displacement of the train. The turning on/off control unit hence turns on or turns off the fixed transceiver system according to whether the train is about to enter the tunnel or else is exiting from the tunnel.

Figure 10:
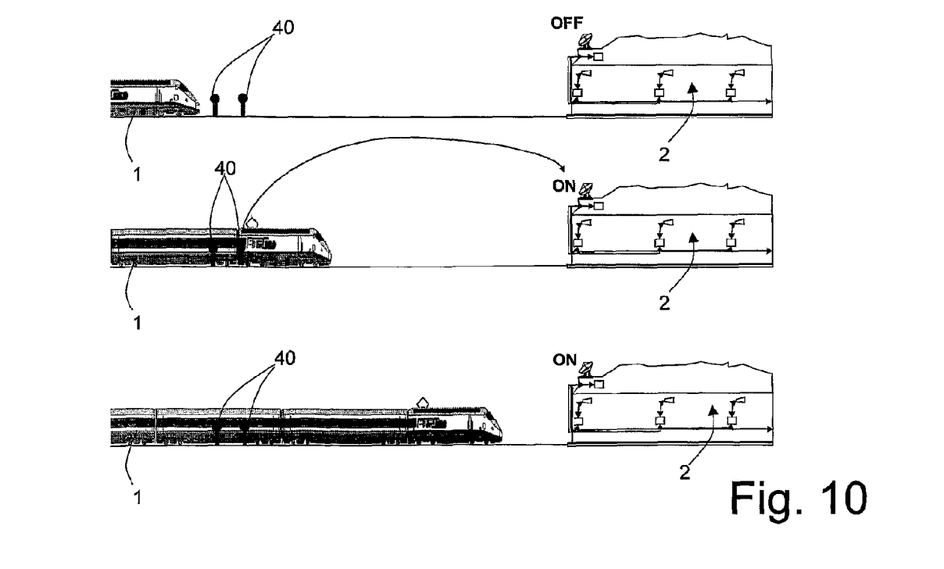
FIG. 10 is a schematic illustration of a second scenario of example in which a satellite communication system according to a preferred embodiment of the present invention operates.

In this regard, FIG. 10 is a schematic illustration of a scenario of example in which:
(top picture) the train 1 is approaching the tunnel 2, the fixed transceiver system with which the tunnel 2 is equipped is initially turned off (OFF), and along the railway track passage sensors 40 are installed;
(central picture) the passage sensors 40 detect passage of the train 1 and communicate, to a turning on/off control unit (not shown in FIG. 10) coupled with the fixed transceiver system, passage of the train 1 in the direction of the tunnel 2, and consequently the turning on/off control unit turns on the fixed transceiver system (ON); and
(bottom picture) the train 1 is about to enter the tunnel 2, and the fixed transceiver system is turned on (ON).

As an alternative to or together with the automatic turning on/off system, the fixed transceiver system can also be coupled with a remote-control centre configured to:
monitor the trains that are travelling on the railway network and the respective positions;
store the positions of the railway tunnels;
determine whether a monitored train, for example the train 1, is about to enter a railway tunnel, for example the tunnel 2, on the basis of the positions of the railway tunnels and of the positions of the monitored trains;
determine whether a monitored train, for example the train 1, has exited from a railway tunnel, for example the tunnel 2, on the basis of the positions of the railway tunnels and of the positions of the trains monitored;
determine whether a monitored train, for example the train 1, is inside a railway tunnel, for example the tunnel 2, on the basis of the positions of the railway tunnels and of the positions of the trains monitored;
turn on the fixed transceiver system if it is off and a monitored train, for example the train 1, is about to enter the tunnel 2; and
turn off the fixed transceiver system if a monitored train, for example the train 1, has exited from the tunnel 2 and there is no other monitored train inside the tunnel 2.

Hence, turning-on/off of the fixed transceiver system can be provided by means of an asynchronous communication from the remote control centre, which compares the positions of the trains that are travelling on the railway network with those of the railway tunnels.

Finally, the present applicant has conducted in-depth studies on the possibility of transmitting a signal in railway tunnels, said studies having led to conclude that in the presence of a train the problems linked to multipath are not serious and do not lead to significant degradations of the signal. This is true especially for wide-band signals.

From the foregoing description the advantages of the present invention may be immediately understood.

In particular, the system forming the subject of the present invention can advantageously be exploited for carrying any type of satellite communication and/or satellite navigation that it is desired to convey into tunnels or areas of non-visibility of the satellites and for offering in the sector of railway transport a very high number of potential services, which extend from navigation, to monitoring, and even safety.

In addition, the system forming the subject of the present invention enables supply of the satellite signal in tunnels with the same carriers of the uplink and downlink bands and with the same carrier frequencies used in areas of visibility of the satellites.

Once again, the system forming the subject of the present invention enables the satellite signals to be conveyed in tunnels of any length using optical-fibre connections and electro-optical apparatuses for conversion from radio frequency to optical frequency and vice versa.

In particular, the system forming the subject of the present invention enables the physical limit of 8 km of some single-repeater systems currently known to be overcome; it can thus be installed in tunnels of any length.

In addition, the use of the automatic system for turning on/off the fixed transceiver system enables energy saving when inside the tunnels no trains are present, limitation of the environmental impact linked to the transmission when no trains are present inside the tunnels, and increase in the service life of the fixed transceiver system.

On the other hand, instead of the system described in JP2001230718, the system forming the subject of the present invention is able to support bidirectional communications, comprises a multi-repeater fixed transceiver system that can be installed in tunnels of any length and an automatic system for turning on/off the fixed transceiver system, and implements an automatic switching between the satellite radio channel and the ground radio channel retransmitted in the tunnel by using hardware/software modules integrated directly with the mobile transceiver system located on the train.

In addition, instead of the system described in JP2001308765, the system forming the subject of the present invention is able to support bidirectional communications, and comprises a fixed transceiver system, which can be installed in tunnels of any length and comprises a plurality of repeaters connected by optical fibre and an automatic system for turning on/off the fixed transceiver system, which turns on the fixed transceiver system only when a train is present. In addition, the fixed ground antennas used for retransmission of the satellite radio channel in the tunnel are purposely designed to provide a low directionality and a low impact from the technological standpoint and in terms of encumbrance in the tunnel.

Finally, as compared to the system described in WO2007113861, the present invention differs and provides specialized solutions on account of its particular features; namely:

presence of a fixed transceiver system comprising a plurality of repeaters inside the tunnel connected by optical fibre for bidirectional transmission of the wide-band satellite signal;

optimization of the directionality of the antennas, both those of the fixed transceiver system inside the tunnel and that of the mobile transceiver system installed on the train;

use of the same carrier bands and of the same carrier frequencies both in areas of visibility of the satellites and in areas of non-visibility of the satellites without, hence the need for any conversion of the carriers of the bands or conversion of the carrier frequencies used both in uplink and in downlink, i.e., enabling the mobile transceiver system installed on the train to use in the tunnel the same signal with the same carrier frequencies used outside; and use of the automatic system for turning on/off the fixed transceiver system, which turns on the fixed transceiver system only when a train is present in the tunnel.

Finally, it is clear that various modifications may be made to the present invention, all of which fall within the sphere of protection of the invention defined in the annexed claims.

In particular, it is here intended to emphasize how, where in the description of the invention explicit reference has been made to antennas, receivers, and signals for the GPS system there is implied the possibility, altogether equivalent, to use antennas, receivers, and signals for other global satellite navigation systems (GNSSs), such as, for example, the Galileo system.

The invention claimed is:

1. A satellite communication system for extending communications between a vehicle and a satellite in an area of non-visibility of the satellite, comprising:

a fixed transceiver system which comprises a first antenna intended to be positioned outside the area of non-visibility of the satellite and at least one second antenna coupled with the first antenna and intended to be positioned in the area of non-visibility of the satellite, and is configured to:
receive through the first antenna downlink signals transmitted by the satellite on at least one downlink carrier frequency, and
transmit the received downlink signals on the at least one downlink carrier frequency in the area of non-visibility of the satellite through the at least one second antenna; and a mobile transceiver system, which is intended to be installed on the vehicle, comprises a third antenna and a fourth antenna, and is configured to:
receive through the third antenna the downlink signals transmitted by the fixed transceiver system on the at least one downlink carrier frequency,
receive through the fourth antenna the downlink signals transmitted by the satellite on the at least one downlink carrier frequency,
determine whether the vehicle is in the area of non-visibility of the satellite or in an area of visibility of the satellite, and
transmit uplink signals on at least one uplink carrier frequency through the third antenna if the vehicle is in the area of non-visibility of the satellite or through the fourth antenna if the vehicle is in the area of visibility of the satellite;

the fixed transceiver system being further configured to:

receive through the at least one second antenna the uplink signals transmitted by the mobile transceiver system on the at least one uplink carrier frequency, and transmit the received uplink signals to the satellite on the at least one uplink carrier frequency through the first antenna;

the mobile transceiver system being further configured to:

compute a first quality indicator that indicates a quality of the downlink signals received through the third antenna;

compute a second quality indicator that indicates a quality of the downlink signals received through the fourth antenna; and determine whether the vehicle is in the area of non-visibility of the satellite or in the area of visibility of the satellite based on a comparison of the computed first quality indicator and the second quality indicator relative to each other.

2. The satellite communication system of claim 1, wherein the area of non-visibility of the satellite is a tunnel.

3. The satellite communication system of claim 2, wherein the fixed transceiver system comprises a plurality of second antennas coupled with the first antenna and intended to be located in different positions inside the tunnel so as to cover the entire length of the tunnel.

4. The satellite communication system according to claim 2, wherein the vehicle is a train.

5. The satellite communication system according to claim 1, wherein the first antenna is a directional antenna intended to be positioned outside the area of non-visibility of the satellite so as to be aligned with the satellite, wherein each second antenna is a non-directional antenna, wherein the third antenna is a non-directional antenna, and wherein the fourth antenna is a directional antenna intended to be installed on the vehicle so as to be aligned with the satellite.

6. The satellite communication system according to claim 1, wherein the mobile transceiver system further comprises a fifth antenna configured to receive navigation satellite signals, and is further configured to:

determine whether the vehicle is in the area of non-visibility of the satellite or in the area of visibility of the satellite on the basis of the navigation satellite signals received by the fifth antenna.

7. The satellite communication system of claim 6, wherein the mobile transceiver system is further configured to:

if the vehicle is in the area of non-visibility of the satellite, receive the downlink signals only through the third antenna; and, if the vehicle is in the area of visibility of the satellite, receive the downlink signals only through the fourth antenna.

8. The satellite communication system according to claim 6, wherein the fixed transceiver system further comprises a sixth antenna configured to receive navigation satellite signals and intended to be positioned outside the area of non-visibility of the satellite, and at least one repeater coupled with the sixth antenna and intended to be positioned in the area of non-visibility of the satellite, the fixed transceiver system being further configured to:

transmit in the area of non-visibility of the satellite by means of the at least one repeater the navigation satellite signals received by the sixth antenna;

the mobile transceiver system further comprising a satellite navigation receiver coupled with the fifth antenna and configured to:

compute, on the basis of the navigation satellite signals received by the fifth antenna, an overall clock error that includes an intrinsic clock error and, when the vehicle is in the area of non-visibility of the satellite, an additional clock error that depends upon the position of the fifth antenna with respect to the sixth antenna; and determine, on the basis of the computed overall clock error, when the vehicle enters the area of non-visibility of the satellite and when the vehicle exits from the area of non-visibility of the satellite.

9. The satellite communication system of claim 1, wherein the first quality indicator is a first bit-error rate ($BER_T$) computed on the basis of the downlink signals received through the third antenna, wherein the second quality indicator is a second bit-error rate ($BER_S$) computed on the basis of the downlink signals received through the fourth antenna, and wherein the mobile transceiver system is further configured to:

determine that the vehicle is in the area of visibility of the satellite if the computed first bit-error rate ($BER_T$) is higher than the computed second bit-error rate ($BER_S$); and determine that the vehicle is in the area of non-visibility of the satellite if the computed first bit-error rate ($BER_T$) is lower than the computed second bit-error rate ($BER_S$) and no navigation satellite signal is received by the fifth antenna.

10. The satellite communication system of claim 9, wherein the mobile transceiver system further comprises:

a first converter coupled with the fourth antenna and configured to bring from radio frequency (RF) down to baseband (BB) the downlink signals received through the fourth antenna and to bring from baseband (BB) up to radio frequency (RF) modulated uplink signals to be transmitted;

a first modem coupled with the first converter and configured to demodulate the downlink signals received through the fourth antenna and brought down to baseband (BB) and to modulate uplink signals to be transmitted;

a first analysis module coupled with the first modem and configured to compute the second bit-error rate ($BER_S$) on the basis of the downlink signals received through the fourth antenna, brought down to baseband (BB) and demodulated;

a second converter coupled with the third antenna and configured to bring from radio frequency (RF) down to baseband (BB) the downlink signals received through the third antenna and to bring from baseband (BB) up to radio frequency (RF) modulated uplink signals to be transmitted;

a second modem coupled with the second converter and configured to demodulate the downlink signals received through the third antenna and brought down to baseband (BB) and to modulate uplink signals to be transmitted;

a second analysis module coupled with the second modem and configured to compute the first bit-error rate ($BER_T$) on the basis of the downlink signals received through the third antenna, brought down to baseband (BB) and demodulated;

a satellite navigation receiver coupled with the fifth antenna and configured to compute a position of the vehicle on the basis of the navigation satellite signals received by the fifth antenna;

a third analysis module coupled with the satellite navigation receiver and configured to detect whether no navigation satellite signal is received by the fifth antenna; and a switcher coupled with the first modem, with the first analysis module, with the second modem, with the second analysis module, with the third analysis module, and with an internal communication network of the vehicle, said switcher being configured to, if the vehicle is in the area of visibility of the satellite, send to the internal communication network the downlink signals received through the fourth antenna, brought down to baseband (BB) and demodulated, and send to the first modem uplink signals to be transmitted received from the internal communication network, and, if the vehicle is in the area of non-visibility of the satellite, send to the internal communication network the downlink signals received through the third antenna, brought down to baseband (BB) and demodulated, and send to the second modem uplink signals to be transmitted received from the internal communication network.

11. The satellite communication system according to claim 1, wherein the fixed transceiver system further comprises a first signal distribution/acquisition electro-optical system coupled with the first antenna and, for each second antenna, a respective second signal distribution/acquisition electro-optical system, the first signal distribution/acquisition electro-optical system being coupled with each second signal distribution/acquisition electro-optical system by means of at least one optical-fibre connection.

12. The satellite communication system of claim 11, wherein the first signal distribution/acquisition electro-optical system comprises:

a first duplexer coupled with the first antenna;

a first low-noise amplifier connected by means of a coaxial cable to the first duplexer;

a first power amplifier connected by means of a coaxial cable to the first duplexer;

a first bidirectional electro-optical converter, connected by means of a coaxial cable to the first low-noise amplifier and to the first power amplifier;

an optical combiner connected by optical fibre to the first electro-optical converter; and an optical splitter connected by optical fibre to the first electro-optical converter.

13. The satellite communication system of claim 11, wherein each second signal distribution/acquisition electro-optical system comprises:

a respective second duplexer coupled with the respective second antenna;

a respective second low-noise amplifier connected by means of a coaxial cable to the respective second duplexer;

a respective second power amplifier connected by means of a coaxial cable to the respective second duplexer; and a respective second bidirectional electro-optical converter connected by means of a coaxial cable to the respective second low-noise amplifier and to the respective second power amplifier.

14. The satellite communication system according to claim 1, wherein the fixed transceiver system is further configured to:

turn on automatically if it is off and a vehicle is about to enter the area of non-visibility of the satellite; and turn off automatically if a vehicle exits from the area of non-visibility of the satellite and there is no other vehicle in the area of non-visibility of the satellite.

15. The satellite communication system according to claim 1, further comprising:

at least one sensor installed outside the area of non-visibility of the satellite and configured to detect whether a vehicle is about to enter the area of non-visibility of the satellite, and detect whether a vehicle has exited from the area of non-visibility of the satellite; and a turning on/off control unit coupled with the fixed transceiver system and with the at least one sensor and configured to turn on the fixed transceiver system if it is off and the at least one sensor detects that a vehicle is about to enter the area of non-visibility of the satellite, and turn off the fixed transceiver system if the at least one sensor detects that a vehicle has exited from the area of non-visibility of the satellite and there is no other vehicle in the area of non-visibility of the satellite.

16. The satellite communication system according to claim 1, wherein the fixed transceiver system is coupled with a remote control centre and is configured to be turned on and turned off by said remote-control centre which is configured to:

monitor vehicles in movement;

determine whether a monitored vehicle is about to enter the area of non-visibility of the satellite;

determine whether a monitored vehicle has exited from the area of non-visibility of the satellite;

turn on the fixed transceiver system if it is off and a monitored vehicle is about to enter the area of non-visibility of the satellite; and turn off the fixed transceiver system if a monitored vehicle has exited from the area of non-visibility of the satellite and there is no other monitored vehicle in the area of non-visibility of the satellite.

17. A fixed transceiver system for a satellite communication system for extending communications between a vehicle and a satellite in an area of non-visibility of the satellite, comprising:

a first antenna intended to be positioned outside the area of non-visibility of the satellite and at least one second antenna coupled with the first antenna and intended to be positioned in the area of non-visibility of the satellite, wherein the fixed transceiver system is configured to:

receive through the first antenna downlink signals transmitted by the satellite on at least one downlink carrier frequency, and transmit the received downlink signals on the at least one downlink carrier frequency in the area of non-visibility of the satellite through the at least one second antenna;

receive through the at least one second antenna uplink signals transmitted by a third antenna of a mobile transceiver system intended to be installed on the vehicle on at least one uplink carrier frequency, wherein the mobile transceiver system is configured to (i) compute a first quality indicator that indicates a quality of the downlink signals received through the third antenna, (ii) compute a second quality indicator that indicates a quality of the downlink signals received through a fourth antenna of the mobile transceiver system, and (iii) determine whether the vehicle is in the area of non-visibility of the satellite or in the area of visibility of the satellite based on a comparison of the computed first quality indicator and the second quality indicator relative to each other; and transmit the received uplink signals to the satellite on the at least one uplink carrier frequency through the first antenna.

18. A mobile transceiver system for a satellite communication system for extending communications between a vehicle and a satellite in an area of non-visibility of the satellite, comprising:

a first antenna and a second antenna intended to be installed on the vehicle and configured to:

receive through the first antenna downlink signals transmitted by a fixed transceiver system on at least one downlink carrier frequency, receive through the second antenna the downlink signals transmitted by the satellite on the at least one downlink carrier frequency, compute a first quality indicator that indicates a quality of the downlink signals received through the first antenna;

compute a second quality indicator that indicates a quality of the downlink signals received through the second antenna;

determine whether the vehicle is in the area of non-visibility of the satellite or in an area of visibility of the satellite based on a comparison of the computed first quality indicator and the second quality indicator relative to each other; and transmit uplink signals on at least one uplink carrier frequency through the first antenna if the vehicle is in the area of non-visibility of the satellite or through the second antenna if the vehicle is in the area of visibility of the satellite.

* * * * *